United States Patent

[11] 3,593,433

[72] Inventors Leo L. Dillon;
Helen S. Dillon, both of 10420 S. Lavergne, Oak Lawn, Ill. 60453
[21] Appl. No. 5,513
[22] Filed Jan. 26, 1970
[45] Patented July 20, 1971

[54] METHOD AND APPARATUS FOR TEACHING READING
6 Claims, 4 Drawing Figs.

[52] U.S. Cl. .................................................. 35/35 R, 46/117
[51] Int. Cl. ........................................ G09b 17/00
[50] Field of Search............................................ 35/35 R, 35 C, 35 E, 35 H, 8 R, 8 A, 71, 22; 46/115, 116, 117, 151

[56] References Cited
UNITED STATES PATENTS

| | | | |
|---|---|---|---|
| 364,845 | 6/1887 | Oakley.......................... | 35/71 |
| 1,435,660 | 11/1922 | Rogerson...................... | 35/1 |
| 1,552,357 | 9/1925 | Terry............................ | 35/35 R X |
| 1,926,139 | 9/1933 | Browne........................ | 35/1 X |
| 1,900,742 | 8/1959 | Barker et al.................. | 35/35 H |

Primary Examiner—Wm. H. Grieb
Attorney—Hume, Clement, Hume & Lee

ABSTRACT: This invention presents an educational kit and associated method of teaching. Particularly well suited for use by young children, this invention utilizes environmental objects familiar to them to captivate their attention while they are schooled in the fundamentals of reading.

INVENTORS.
LEO L. DILLON
HELEN S. DILLON
BY Hume, Clement Hume & Lee
Attorneys.

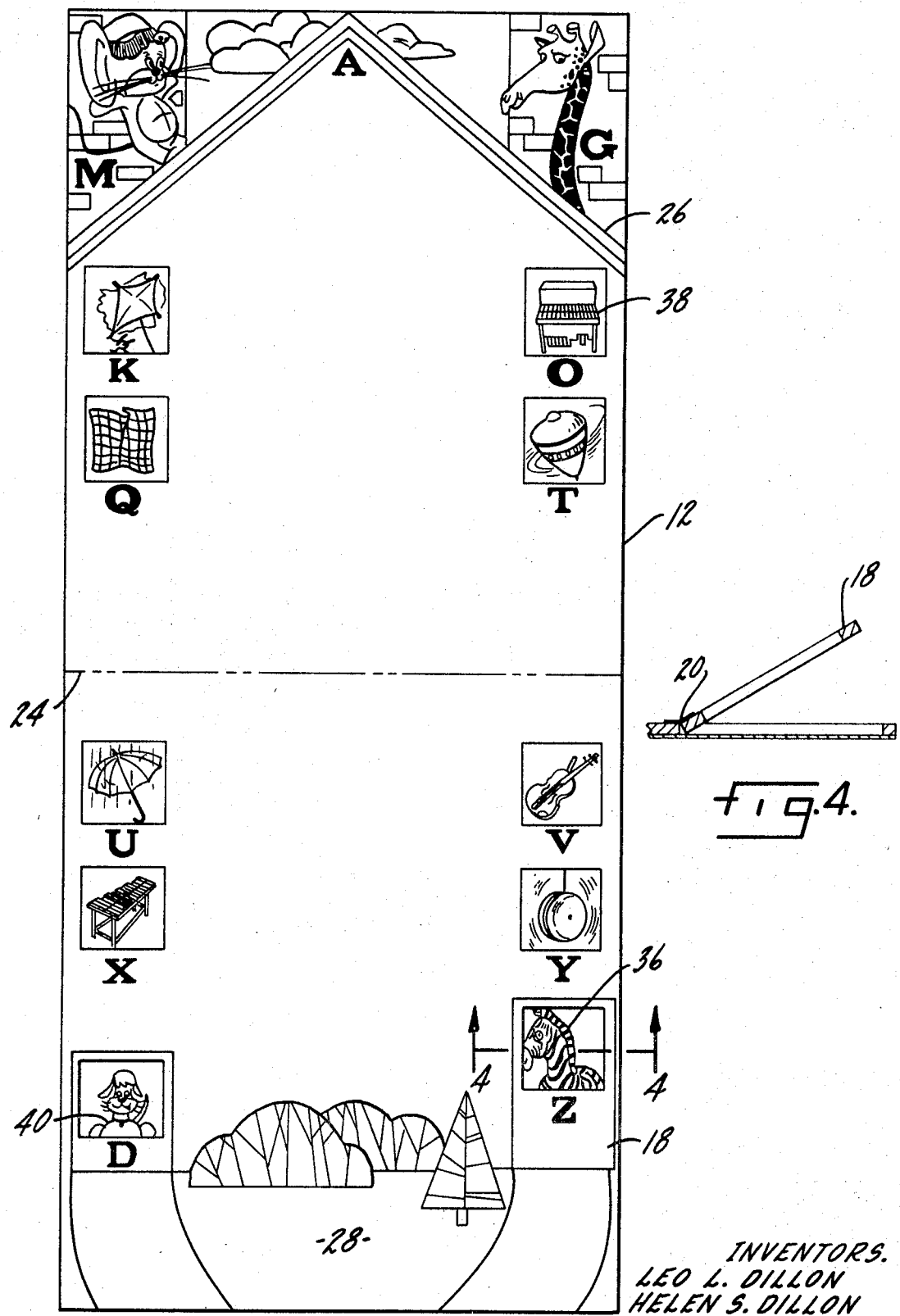

METHOD AND APPARATUS FOR TEACHING READING

BACKGROUND OF THE INVENTION

This invention relates to educational apparatus and more particularly to apparatus for teaching reading to young children.

It is widely accepted that intellectual development in the early years of childhood is crucial to the proper education of the child. The experiences that children undergo during the first four or five years determine to a large degree the dimensions of their intellectual potential. If children meet success in these early learning experiences, they carry this success to each new learning setting and become more comfortable and competent with the unknown.

Reading is the key to all academic learning. If children are to be prepared with the skills to read at an early age, preparatory instruction must begin before the kindergarten years. Recently, kindergarten teachers have placed a re-emphasis on identifying and learning the letters of the alphabet and their sounds, thus stressing the alphabet-phonetic approach. Many teachers of the mentally handicapped and of remedial groups have also been successful with the alphabet-phonetic approach for their beginning reading instruction.

To successfully teach the young child, the instructing procedure should be interesting, fun, and devoid of pressure. Furthermore, all lessons should be properly selected and presented in an educationally sound manner. Because of the child's relatively short attention span, any educational device prepared for the use of children should take that factor into account and not place a great demand on the child's concentration.

The present invention responds to the need for a self-contained educational device to properly teach young children to read through the alphabet-phonetic method.

SUMMARY OF THE INVENTION

This invention presents an educational kit designed to teach a portion of reading readiness and beginning reading by the alphabet-phonetic method. A series of programmed instructions delivered by an acoustical device and an associated plaything or game board constitute the essential components of this invention. Coordinating the instructions with activities to be acted out with the plaything or on the gameboard involves the child both mentally and physically in the learning process. Not only are the auditory and thinking mechanisms of the child activated but also the physical coordination and exercise of motor capabilities are stimulated. The audible instructions proceed in a segmented series, beginning by mentally associating a letter with an object and the word denoting the object and finally progressing through sentences constructed from the objects. The presentation is designed to captivate the child's attention and hold it throughout each learning segment. Additionally, the learning instructions have been carefully designed to incorporate educationally sound techniques.

BRIEF DESCRIPTION OF THE DRAWINGS

The advantages and features of this invention will become more apparent in the following description and drawings wherein:

FIG. 3 is a top view of the board illustrated in FIG. 1 in its expanded mode.

FIG. 4 is a cross-sectional view taken along line 4—4 in FIG. 3 and looking in the direction of the arrows.

DESCRIPTION OF THE PREFERRED EMBODIMENTS

Figure 1:
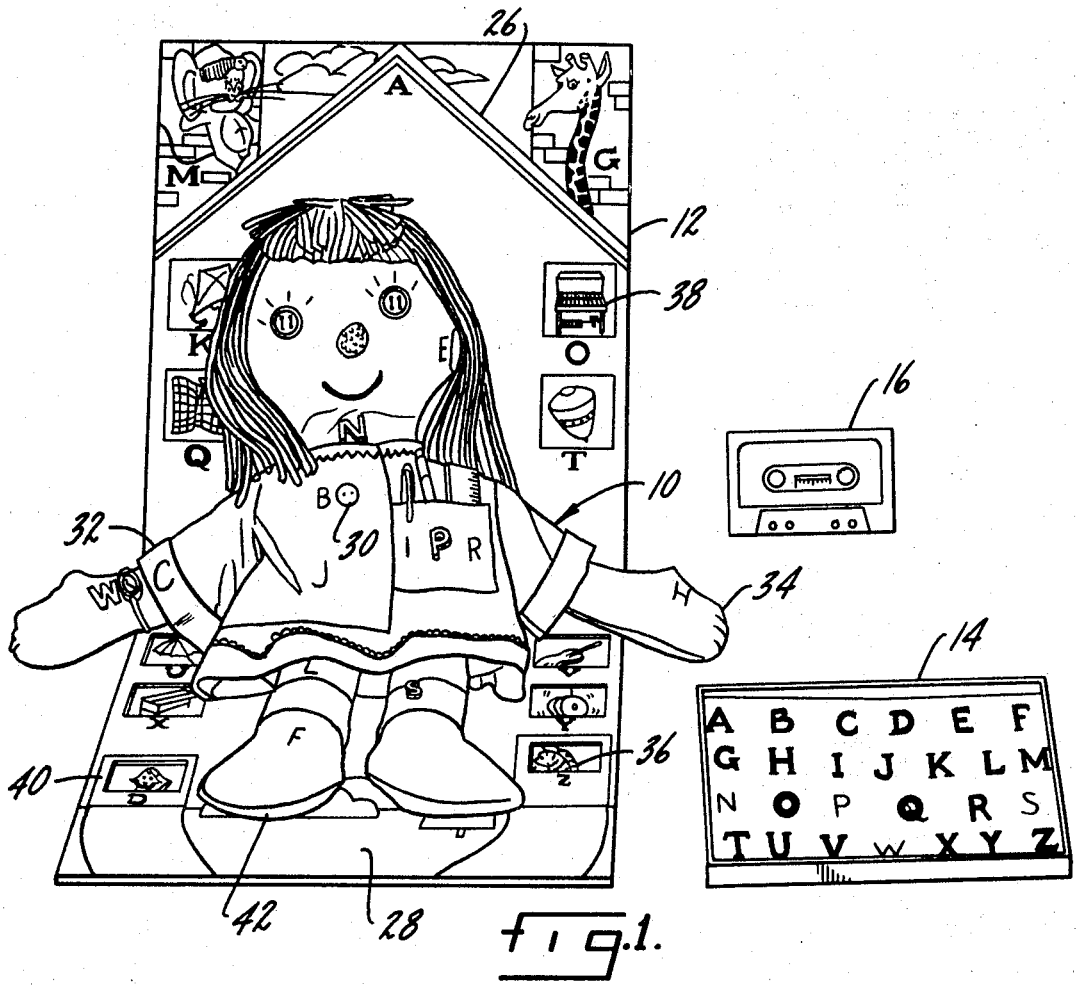
FIG. 1 is an assembly of the component parts of this invention.

Referring now to the drawings, wherein like numerals represent like parts, FIG. 1 illustrates the component parts of the invention. A doll 10 has been provided with wearing apparel such as a jacket and has easily discernible anatomical features such as a hand 34 and feet 42. This doll has been illustrated as a young girl and accordingly hereinafter shall be referred to as Ann. Obviously, the gender and type of doll utilized is relatively unimportant and may be designed to fit the needs of the particular user. Preferably Ann is designed to exude warmth and affection and generate reciprocal feelings in the user, for Ann is to become the teacher of this educational kit. Ann has been provided with a number of letters corresponding to parts of her body, wearing apparel, and accoutrements. For example, the letter H on the hand 34, the C on the cuff 32, the B adjacent the button 30, etc. Conveniently, these letters may be formed of a plastic material, magnetic tape or ribbon, but any material that will accept and hold indicia, in a manner to be hereinafter described, is suitable.

Figure 2:
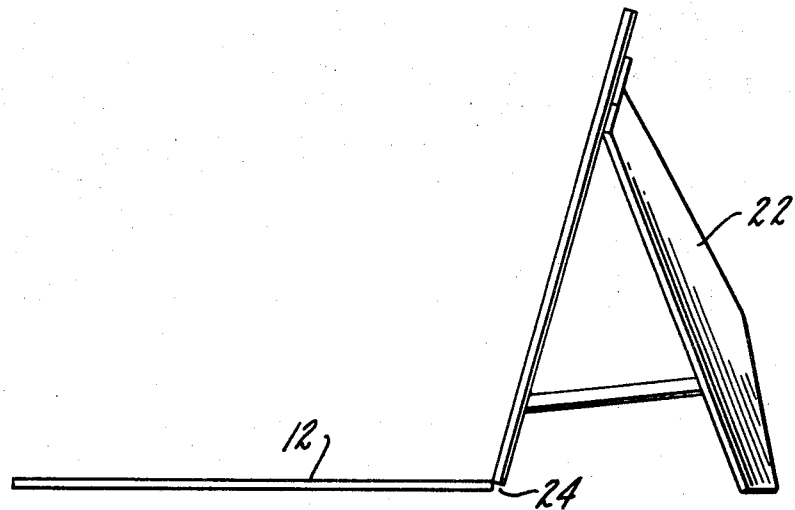
FIG. 2 is a side view of the board illustrated in FIG. 1.

Ann is resting upon a board 12 that has been designed to represent Ann's home, including a roof 26 and a lawn 28 (best seen in FIG. 3). On the outer edge of the board and around Ann's periphery, a number of environmental objects and animals that are familiar to a young child shall be utilized in the educational process. Conveniently, these objects and animals comprising Ann's environment may be a dog 40, a zebra 36, an organ 38, etc. As with many of the items of Ann's clothing, these objects and animals have been provided with a letter adjacent to them that corresponds to the first letter in the word that denotes these objects. Thus the O has been placed adjacent the organ 38, the D adjacent to dog 40, and Z adjacent the zebra 36. For ease in packing and storing, the board 12 may be hinged at 24. Reference to FIG. 2 will reveal that the hinged board 12 may be readily positioned in a stable manner by adding a supporting stand 22.

A box of individual letters 14 that correspond to the environmental letters denoting the objects of Ann's world are included in this educational kit. Preferably the letters 14 are made of plastic that will adhere to other plastic material or these are magnetized and thus may readily be attached to the letters of Ann's world. Of course, if other than plastic or magnetic letters are used to denote the objects surrounding and on Ann, the individual letters 14 will be formed of a material that adheres thereto. A record player or tape recorder 16 forms the instructing unit of this educational kit. The record player or if a tape recorder is used it may be of any inexpensive design and preferably is of the type that utilizes cassette loading. Of course it is advisable, since this kit is designed primarily for preschool children, to make the record player or tape recorder as durable and easy to operate as possible. Although in this description a record player or tape recorder will be utilized, it is obvious that any acoustical device may be employed in place thereof.

The instructional program is divided into three units of substantially equal length designed to be able to hold the child's attention during a continuous lesson. An instructional segment of 20 minutes has been found to be satisfactory. Conveniently, the instructional segments may be self-contained in an individual record or cassette. The instructional program proceeds through 3 segments as follows:

INSTRUCTIONAL SEGMENT NO. 1

The letters of the alphabet are presented in the first instructional segment. The child listens, perceives, and then manipulates the letters according to Ann's oral instructions. Ann will instruct the child to pick up the plastic or magnetic letters from the tray and match them with the letters on Ann's environment, for example B is for button on the dress; P is for a pencil in her pocket; and M is for a mouse in the chimney of the playhouse. As Ann teaches each letter, she instructs the child to hold, examine, match, and recite it; then the child is instructed to place the selected individual letter on its matching environmental counterpart and finally the child is instructed to repeat the letter with its object, for example "D is for dog." To lessen the monotony of the instructional segment, songs may be incorporated into the training segment and during the repetitive drills Tippy-Toe the mouse or Zippy the Zebra may be the leaders and provide a source of enjoyment and fun for the young children.

INSTRUCTIONAL SEGMENT NO. 2

Having become familiarized with the names of the letters the child is now introduced to the sounds these letters make. The object for the letter is also that which presents the sound, for example B is for B...utton, C is for C...uff and so on. The sounds and letters are carefully examined and studied with the child seeing, hearing and repeating the letter sounds. As reinforcement drill techniques, songs and nursery-type rhymes may be employed to capture and retain the child's attention during the reteaching sessions of the phonic lessons.

INSTRUCTIONAL SEGMENT NO. 3

As the child progressed through the first two instructional segments he has seen and heard the termination of letters and the sounds that they produce. His next plateau is the arrangement of words to produce simple sentences. Aided by the colorful, meaningful environmental objects the child finds himself easily structuring his words into simple sentences. By using his knowledge of sounds, the child is helped to decode the words and the mastery of these developmental tasks provides the child with actual beginning reading skills.

Other attention-retaining devices may easily be utilized with this basic educational kit. For example, during the reinforcement review Zippy the Zebra may be completely uncovered for the child's delight and inspection by lifting the cover 18, hinged at 20, as shown in FIG. 4. Also it is apparent that the particular objects and animals utilized herein are by no means to be understood in a limiting manner, the only consideration being that they should be objects and animals that are familiar to a young child. Thus an educational kit and concept finding particular utility in teaching the alphabet-reading technique has been described.

This educational kit and method of teaching are particularly well designed to captivate and retain the child's attention. Also the kit is of extremely rugged construction, permitting even the youngest child to use it without fear of damage. Children utilizing this invention will be better able to merge into the schooling environment and readily develop the reading skills so crucial to intellectual development.

Although the particular embodiment of the present invention has been shown and described in some detail herein, there is no intention to thereby limit the invention to the details of that embodiment. On the contrary, the intention is to cover all modifications, alternative embodiments, usages and equivalence of the educational device that fall within the spirit and scope of the invention as expressed and defined in the specification and the appended claims.

We claim:

1. An educational kit for teaching the art of reading comprising:
    a doll including articles of clothing and discernible anatomical features, said doll further including environmental letters, corresponding to the first letter of the word denoting said clothing and said features, placed in the vicinity of said clothing and features such that said identifying letters are readily associated with the corresponding clothing and features;
    an assemblage of individual letters corresponding to said environmental letters;
    and acoustic means for presenting a user with instructions to select an individual letter from said assemblage and correlate said letter with an identical environmental letter on said doll.

2. The educational kit set forth in claim 1 further comprising:
    a board having recognizable environmental objects and environmental letters, corresponding to the first letter of the word denoting said environmental objects, disposed in the vicinity of said objects;
    individual letters corresponding to said environmental object's first letters included in said assemblage;
    and wherein said acoustic means is adapted to present the user with instructions to correlate said individual letters with said object's first letters.

3. The educational kit set forth in claim 2 wherein at least one of said individual letters is adapted to be attached to a corresponding environmental letter and said acoustic means is adapted to present a user with instructions to attach said at least one individual letter to said corresponding environmental letter.

4. A method of teaching the alphabet-phonetic approach to reading comprising:
    providing a doll including articles of clothing and discernible anatomical features, said doll further including environmental letters corresponding to the first letter of the word denoting said clothing and said features, placed in the vicinity of said clothing and said features;
    providing an assemblage of individual letters corresponding to said environmental letters;
    providing an acoustical means for emitting programmed instructions from an information storage means;
    and programming said information storage means with instructions to select one of said individual letters and correlate said individual letters with a corresponding environmental letter.

5. The method of teaching set forth in claim 4 further including the step of programming said information carrying means to instruct a user to phonetically enunciate the initial letter as part of a word denoting one of said articles of clothing and discernible anatomical features.

6. The method of teaching set forth in claim 5 further including programming said information carrying means to instruct the user to speak simple sentences partially composed of the words denoting said articles of clothing and discernible anatomical features.